US012038792B2

(12) United States Patent
Feng

(10) Patent No.: US 12,038,792 B2
(45) Date of Patent: Jul. 16, 2024

(54) FLEXIBLE DISPLAY PANEL, ELECTRONIC DEVICE, AND HINGE

(71) Applicant: Wuhan China Star Optoelectronics Semiconductor Display Technology Co., Ltd., Hubei (CN)

(72) Inventor: Zikang Feng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/614,557

(22) PCT Filed: Sep. 3, 2021

(86) PCT No.: PCT/CN2021/116396

§ 371 (c)(1),
(2) Date: Nov. 29, 2021

(87) PCT Pub. No.: WO2023/004929

PCT Pub. Date: Feb. 2, 2023

(65) Prior Publication Data

US 2024/0028086 A1 Jan. 25, 2024

(30) Foreign Application Priority Data

Jul. 30, 2021 (CN) ......................... 202110874269.2

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
None
See application file for complete search history.

(56) References Cited

U.S. PATENT DOCUMENTS 10,001,810 B2 * 6/2018 Yoo ........................ G06F 1/1626
10,143,098 B1 * 11/2018 Lee ........................ H04M 1/022
10,599,189 B1 * 3/2020 Hsu ........................ G06F 1/1681
11,048,305 B1 * 6/2021 Ye ........................ G06F 1/1681

FOREIGN PATENT DOCUMENTS

CN 109819071 A * 5/2019
CN 109867652 6/2019
CN 109912592 6/2019
CN 110049964 7/2019
CN 110446702 11/2019
CN 110551135 12/2019

(Continued)

*Primary Examiner* — James Wu
*Assistant Examiner* — Christopher L Augustin

(57) ABSTRACT

The present application provides a flexible display panel, an electronic device, and a hinge. A plurality of support members of the hinge rotate under an action of a rotation mechanism and a linkage mechanism, and a rotation of the support member drives a first packaging mechanism and a second packaging mechanism to rotate. Thus, when the support member is in a first position and a second position, the first packaging mechanism and the second packaging mechanism may shield the rotation mechanism and the linkage mechanism. The packaging mechanism may shield and protect members in the hinge before and after folding a display device.

20 Claims, 12 Drawing Sheets

100 20 30 11 12 13 14 60 50 41 42 40 70

(56) References Cited

FOREIGN PATENT DOCUMENTS

| | | |
|---|---|---|
| CN | 110746409 | 2/2020 |
| CN | 111057005 | 4/2020 |
| CN | 111253332 | 6/2020 |
| CN | 111479799 | 7/2020 |
| KR | 2019-0088030 | 7/2012 |
| KR | 2013-0140303 | 12/2013 |
| KR | 2020-0016498 | 2/2020 |

* cited by examiner

FLEXIBLE DISPLAY PANEL, ELECTRONIC DEVICE, AND HINGE

RELATED APPLICATIONS

This application is a National Phase of PCT Patent Application No. PCT/CN2021/116396 having International filing date of Sep. 3, 2021, which claims the benefit of priority of Chinese Patent Application No. 202110874269.2 filed on Jul. 30, 2021. The contents of the above applications are all incorporated by reference as if fully set forth herein in their entirety.

FIELD AND BACKGROUND OF THE INVENTION

The present application relates to the technical field of display technology, and particularly to a flexible display panel, an electronic device, and a hinge.

With development of display technology, a folding display device has become a major developing direction of a display industry. The folding display device is mainly realized by a combination of a flexible screen and a hinge, and the flexible screen is bent as the hinge bends to realize foldability of the display device. Therefore, various mechanisms are required on the hinge. However, a major problem to be solved is how to hide and protect mechanisms in the hinge before and after folding the display device.

Therefore, a technical problem to be solved is how to hide and protect the mechanisms in the hinge before and after folding the display device.

Technical Problems

A flexible display panel, an electronic device, and a hinge are provided in the present application to alleviate a technical problem that mechanisms in the hinge cannot be hidden and protected before and after folding a display device in the prior art.

SUMMARY OF THE INVENTION

To solve the above problems, the present application provides following technical solutions:

Embodiments of the present application provide a flexible display panel including a hinge and a flexible display panel body, the hinge including:

a plurality of support members;

a plurality of rotation mechanisms disposed on a side of the plurality of support members, each of the rotation mechanism being connected to two of the support members adjacent to each other to rotate the two adjacent support members relatively; and a first packaging mechanism disposed facing the plurality of rotation mechanisms, the plurality of rotation mechanisms being located among the first packaging mechanism and the plurality of support members, the first packaging mechanism including at least one first backplate and at least one second backplate, the first backplate being movably connected to the second backplate, the first backplate and the second backplate being respectively connected to two interspaced support members, and at least one support member is disposed between the two interspaced support members; and wherein the flexible display panel body is located on other side of the plurality of support members away from the rotation mechanism, the flexible display panel body is in a flat state when the plurality of support members are in a first position, the plurality of support members are horizontally arranged and support a flexible display panel body, and the first packaging mechanism is unfolded to form a first included angle is between the first backplate and the second backplate to shield the rotation mechanism.

In the flexible display panel provided in an embodiment of the present application, the flexible display panel body is in a bent state when the plurality of support members are in a second position, the support members at two ends are opposite to each other and disposed on a same side of the support members in the middle, and a second included angle is defined between the first backplate and the second backplate to shield the rotation mechanism, and the second included angle is less than the first included angle.

In the flexible display panel provided in an embodiment of the present application, the hinge further includes a second packaging mechanism, the second packaging mechanism is disposed at an end of the plurality of support members and includes a plurality of packaging members, and each packaging member is fixedly connected with a corresponding support member.

In the flexible display panel provided in an embodiment of the present application, the first backplate and the second backplate are slidably connected to the packaging member at ends of the two interspaced support members, respectively.

In the flexible display panel provided in an embodiment of the present application, a boss is provided on the packaging member slidably connected to the first backplate and the second backplate, a linear groove is respectively provided at each of two ends of the first backplate and the second backplate, and the boss is slidably fitted to a corresponding linear groove.

In the flexible display panel provided in an embodiment of the present application, the plurality of packaging members include a first packaging member, a second packaging member and a third packaging member, the second packaging member is located between the first packaging member and the third packaging member, a first arcuate groove is provided on the first packaging member, a second arcuate protrusion and a second arcuate groove are provided on the second packaging member, and a second arcuate protrusion is provided on the third packaging member, the first arcuate protrusion is slidably mounted in the first arcuate groove, and the second arcuate protrusion is slidably mounted in the second arcuate groove.

In the flexible display panel provided in an embodiment of the present application, rotation axes of the first backplate and the second backplate are overlapped.

In the flexible display panel provided in an embodiment of the present application, the hinge further includes a rotation fixing member, the rotation fixing member is fixedly connected with the support member between the two interspaced support members, and the first backplate and the second backplate are movably connected to the rotation fixing member.

In the flexible display panel provided in an embodiment of the present application, a first shaft hole is provided on the first backplate, a second shaft hole is provided on the second backplate, a third shaft hole is provided on the rotation fixing member, and axes of the first shaft hole, the second shaft hole and the third shaft hole are overlapped.

In the flexible display panel provided in an embodiment of the present application, the rotation mechanism includes a first rotation member and a second rotation assembly, the first rotation member and the second rotation assembly are respectively connected to the two adjacent support members, and the first rotation member is movably connected to the second rotation assembly.

In the flexible display panel provided in an embodiment of the present application, the second rotation assembly includes a second rotation member and a third rotation member disposed at intervals, the first rotation member is fixedly connected to one of the two adjacent support members, the second rotation member and the third rotation member are fixedly connected to the other one of the two adjacent support members, and the first rotation member is slidably connected to the second rotation member and the third rotation member.

In the flexible display panel provided in an embodiment of the present application, the hinge further includes a linkage mechanism, the linkage mechanism is disposed on a side of the plurality of support members and between the support member and the first packaging mechanism, the linkage mechanism is connected to the two interspaced support members to synchronously rotate the two interspaced support members.

In the flexible display panel provided in an embodiment of the present application, the linkage mechanism includes a linkage assembly, the linkage assembly includes a first linkage member and a second linkage member, the first linkage member is connected to one of the two interspaced support members, the second linkage member is connected to the other one of the two interspaced support members, and the first linkage member is synchronously connected to the second linkage member.

In the flexible display panel provided in an embodiment of the present application, the linkage mechanism further includes a connection assembly, the connection assembly includes a first connection member and a second connection member, the first connection member is connected to the first linkage member and one of the two interspaced support members, and the second connection member is connected to the second linkage member and the other one of the two interspaced support members.

An embodiment of the present application further provides an electronic device including a flexible display panel of any of the foregoing embodiments.

An embodiment of the present application further provides a hinge including:

a plurality of support members;

a plurality of rotation mechanisms disposed on a side of the plurality of support members, each of the rotation mechanism being connected to two of the support members adjacent to each other to rotate the two adjacent support members relatively; and a first packaging mechanism disposed on a side away from the plurality of support members, the first packaging mechanism including at least one first backplate and at least one second backplate, the first backplate being movably connected to the second backplate, the first backplate and the second backplate being respectively connected to two interspaced support members, and at least one support member is disposed between the two interspaced support members; and wherein the plurality of support members are horizontally arranged when the plurality of support members are in a first position, a first included angle is formed between the first backplate and the second backplate to shield the rotation mechanism; and when the plurality of support members are in a second position, the support members at two ends are opposite to each other and disposed on a same side of the support members in the middle, a second included angle is defined between the first backplate and the second backplate to shield the rotation mechanism, and the second included angle is less than the first included angle.

In the hinge provided in an embodiment of the present application, the hinge further includes a second packaging mechanism, the second packaging mechanism is disposed at an end of the plurality of support members and includes a plurality of packaging members, and each packaging member is fixedly connected with a corresponding support member.

In the hinge provided in an embodiment of the present application, the first backplate and the second backplate are slidably connected to the packaging member at ends of the two interspaced support members, respectively.

In the hinge provided in an embodiment of the present application, rotation axes of the first backplate and the second backplate are overlapped.

Beneficial Effects

The present application provides a flexible display panel, an electronic device and a hinge. The hinge includes a plurality of support members, and a rotation mechanism is disposed between two adjacent support members to rotate the two adjacent support members relatively. A first packaging mechanism is disposed on a side of the rotation mechanism away from the plurality of support members, and includes at least one first backplate and at least one second backplate. The first backplate is movably connected to the second backplate, and the first backplate and the second backplate are respectively connected to the two interspaced support members. When the plurality of support members are in a first position, a flexible display panel body is in a flat state, the plurality of support members are horizontally arranged and support the flexible display panel body. The first packaging mechanism is unfolded to form a first included angle between the first backplate and the second backplate to shield the rotation mechanism. When the plurality of support members move to a second position, the flexible display panel body is in a bent state. The support members at two ends are opposite to each other and disposed on a same side of the support members in the middle, so that the plurality of support members form a U-shaped surface. A second included angle is formed between the first backplate and the second backplate to shield the rotation mechanism, and the second included angle is less than the first included angle, to hide the first packaging mechanism in a U-shaped structure. Thus, packaging mechanism may shield and protect members in the hinge before and after folding the flexible display panel.

BRIEF DESCRIPTION OF THE SEVERAL VIEW OF THE DRAWINGS

In order to more clearly illustrate embodiments or prior solutions, the drawings required for description of the embodiments or prior art will be briefly described below. It will be apparent that the drawings in the following description are merely some embodiments of the application, and other drawings may be obtained from these drawings without creative effort by the skilled in the art.

DESCRIPTION OF SPECIFIC EMBODIMENTS OF THE INVENTION

Figure 1:
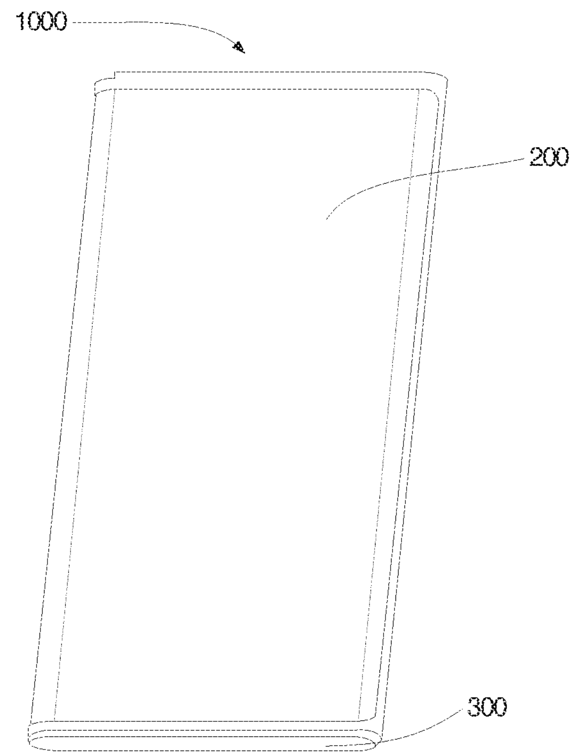
FIG. 1 is a schematic structural diagram of a flexible display panel when folded according to an embodiment of the present application.

The following embodiments are described to illustrate specific embodiments that may be implemented by the present application. The direction terms mentioned in the present application, such as "upper", "lower", "front", "rear", "left", "right", "in", "out", "side", and the like, refer only to the directions of the drawings. Therefore, the direction terms used are intended to illustrate and understand the present application and are not intended to limit the present application. In the drawings, elements of similar structure are denoted by the same reference numerals. In the drawings, thicknesses of some layers and regions are exaggerated for clarity of understanding and ease of description. That is, dimensions and thickness of each assembly shown in the drawings are arbitrarily shown, but the present application is not limited thereto.

Figure 2:
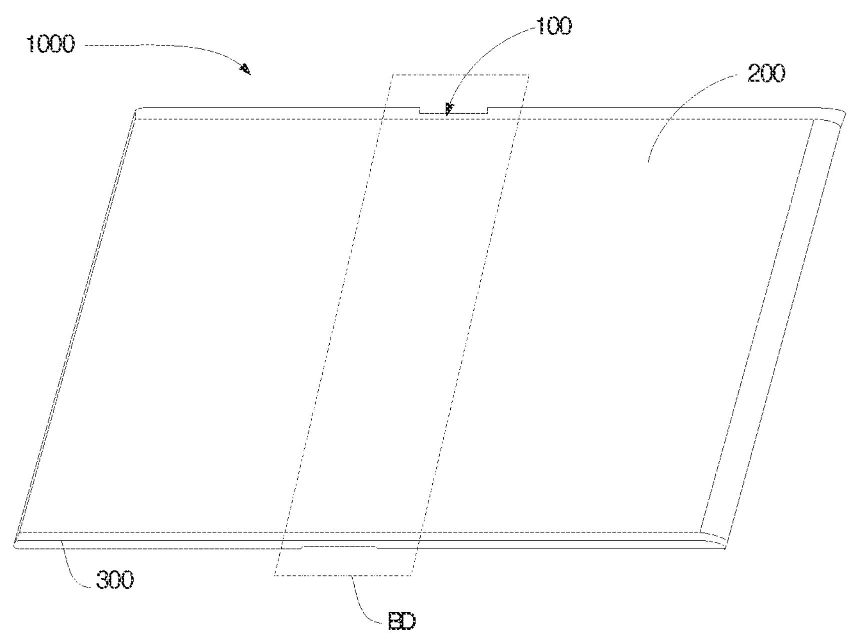
FIG. 2 is a schematic structural diagram of the flexible display panel when unfolded according to an embodiment of the present application.
Figure 3:
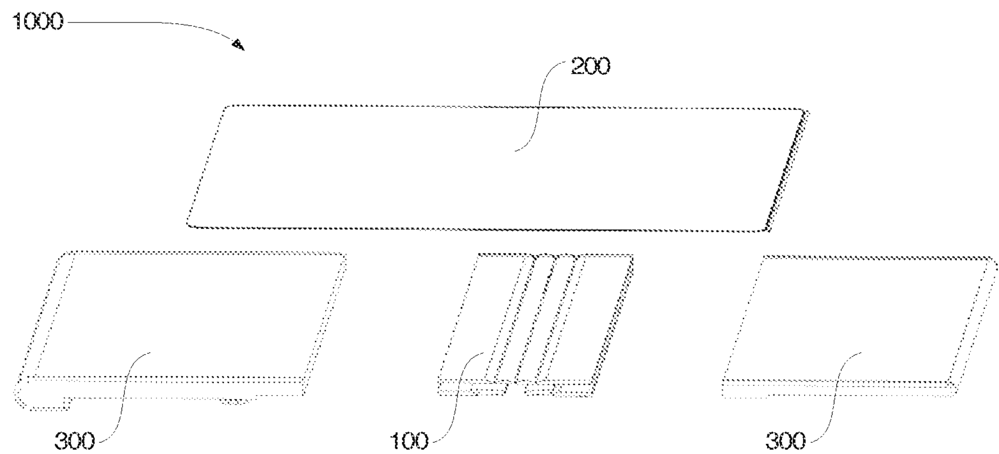
FIG. 3 is an exploded schematic diagram of the flexible display panel according to an embodiment of the present application.

Referring to FIG. 1 to FIG. 3 in combination, FIG. 1 is a schematic structural diagram of a flexible display panel when folded according to an embodiment of the present application, FIG. 2 is a schematic structural diagram of a flexible display panel when unfolded according to an embodiment of the present application, and FIG. 3 is an exploded schematic diagram of a flexible display panel according to an embodiment of the present application. The flexible display panel 1000 includes a hinge 100 and a flexible display panel body 200. The flexible display panel 1000 includes an organic light emitting diode display (OLED) panel. The flexible display panel body 200 may include a flexible substrate, and a driving circuit layer, a light emitting function layer, and a packaging layer sequentially laminated on the flexible substrate. It may be understood that the flexible display panel body 200 may include various functions of an ordinary OLED, which will not be described here.

Since OLED panels have advantages such as being flexible, wearable, and the like, the flexible display panel body 200 may be bent, folded, and curled along with a hinge 100. Therefore, the flexible display panel 1000 may be bent, folded, and curled. An entire length of the hinge 100 is matched with the flexible display panel body 200 to realize a curling of the flexible display panel 1000. In embodiments of the present application, folding of the flexible display panel 1000 is taken as an example for description.

The flexible display panel 1000 has a folding area BD. The hinge 100 is provided corresponding to the folding area BD, and the hinge 100 is fixed to a housing 300 of the flexible display panel 1000 and carries the flexible display panel body 200 together with the housing 300. When the flexible display panel 1000 is used for an electronic device such as a mobile phone, the housing 300 may be a middle frame of the mobile phone.

Figure 4:
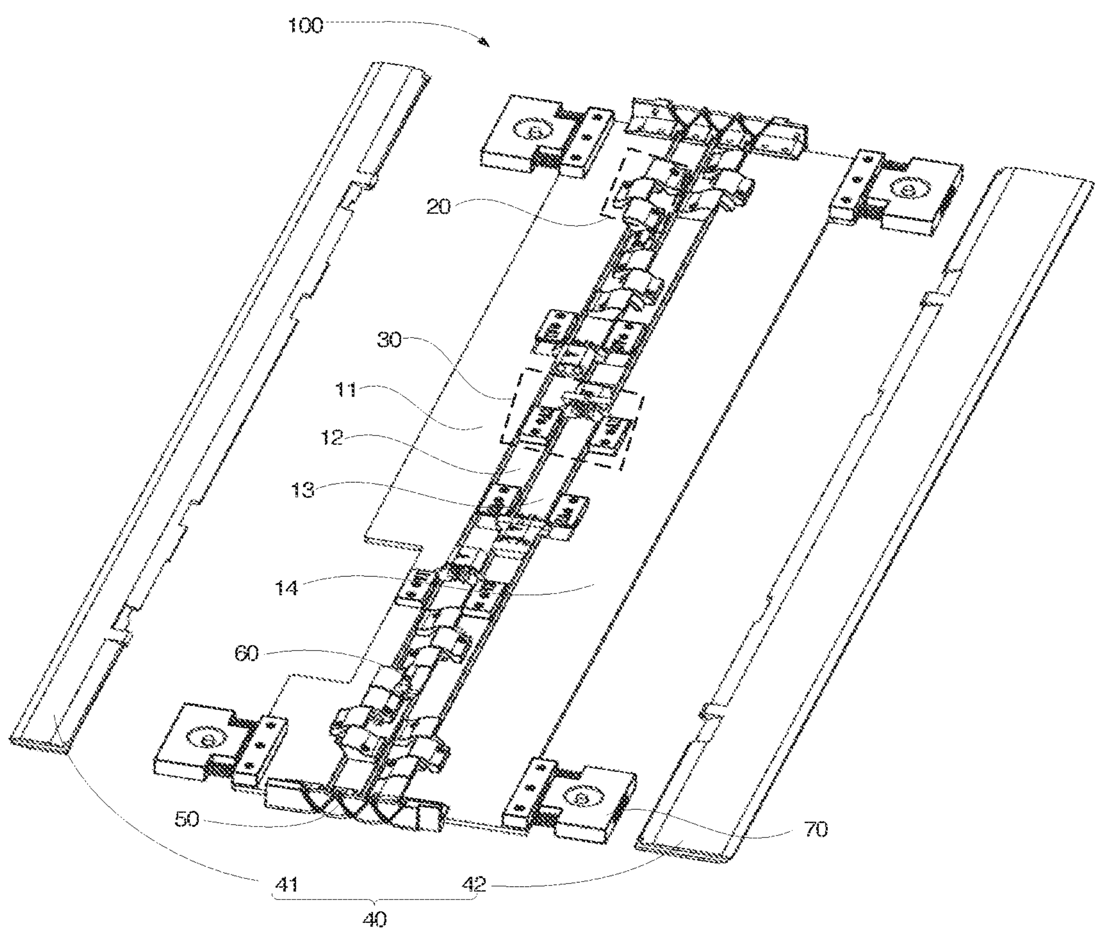
FIG. 4 is a schematic diagram showing an overall structure of a hinge according to an embodiment of the present application.
Figure 5:
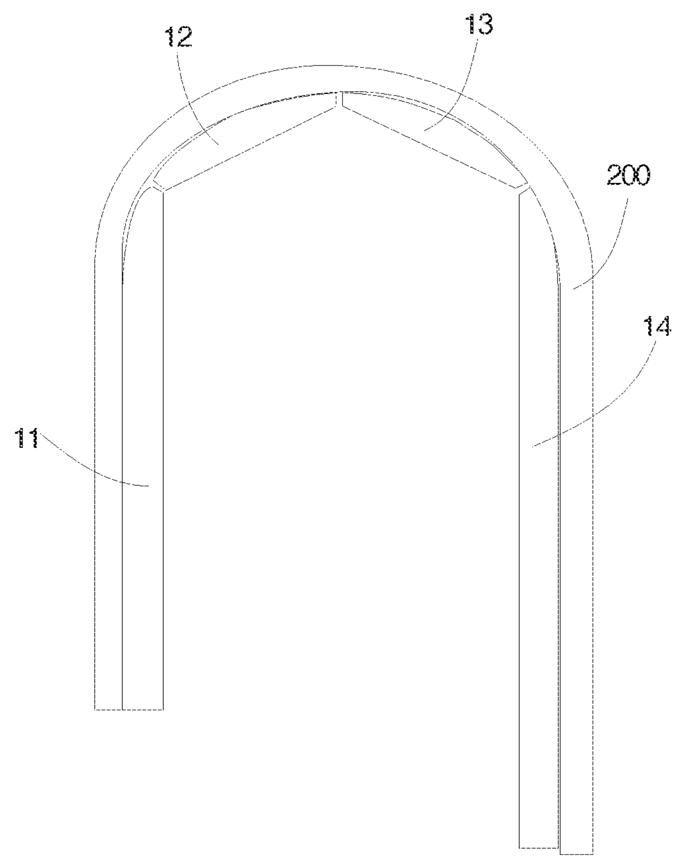
FIG. 5 is a schematic diagram showing an arrangement of a support member after folding the hinge according to an embodiment of the present application.
Figure 6:
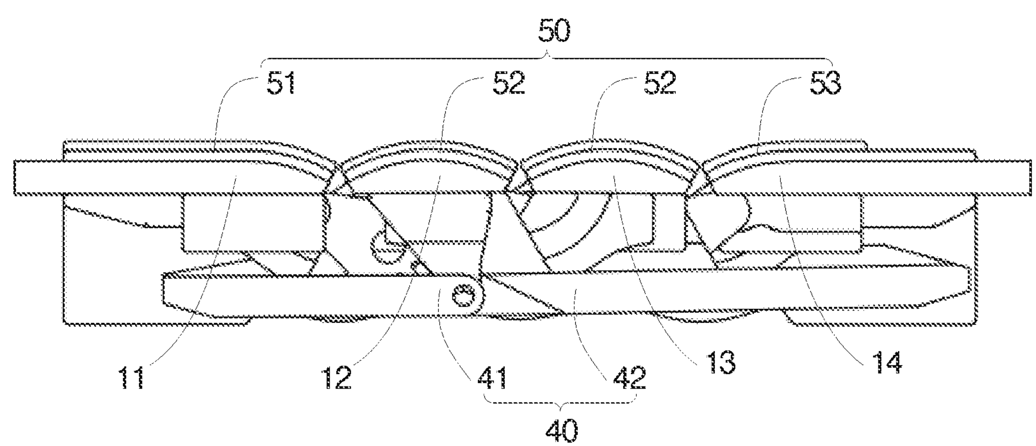
FIG. 6 and FIG. 7 are two cross-sectional schematic diagrams of a first packaging mechanism when the hinge is in a first position according to an embodiment of the present application.
Figure 7:
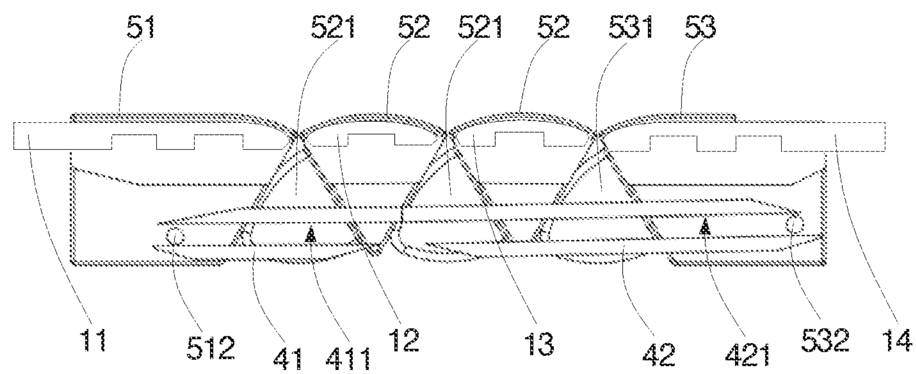
Figure 8:
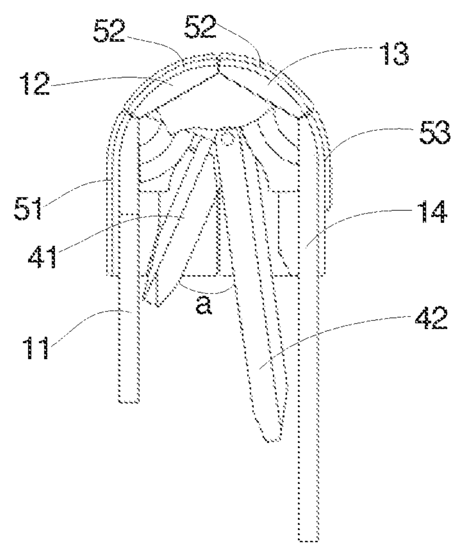
FIG. 8 and FIG. 9 are two cross-sectional schematic diagrams of the first packaging mechanism when the hinge is in a second position according to an embodiment of the present application.
Figure 9:
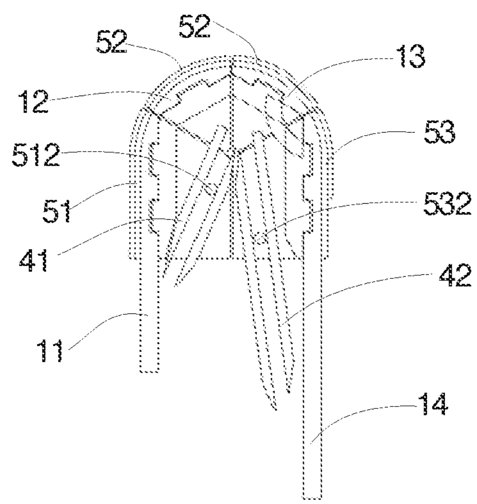

Structures and operating principles of the hinge 100 here will be described in detail below:

Referring to FIG. 1 to FIG. 9 in combination, FIG. 4 is a schematic diagram showing an overall structure of the hinge according to an embodiment of the present application. FIG. 5 is a schematic diagram showing an arrangement of a support member after folding the hinge according to an embodiment of the present application. FIG. 6 and FIG. 7 are two cross-sectional schematic diagrams of a first packaging mechanism when the hinge is in a first position according to an embodiment of the present application. FIG. 8 and FIG. 9 are two cross-sectional schematic diagrams of a first packaging mechanism when the hinge is in a second position according to an embodiment of the present application. The hinge 100 includes a plurality of support members (such as a first support member 11, a second support member 12, a third support member 13, and a fourth support member 14 shown in FIG. 4) successively rotatably connected, a plurality of rotation mechanisms 20, a linkage mechanism 30, and a first packaging mechanism 40. The plurality of rotation mechanisms 20 are provided on a side of the plurality of support members, each of the rotation mechanisms 20 is connected to two adjacent support members (an adjacent first support member 11 and the second support member 12 as shown in FIG. 4) to rotate the two adjacent support members.

The linkage mechanism 30 is provided on a side of the plurality of support members, that is, the linkage mechanism 30 and the rotation mechanism are provided on a same side of the plurality of support members. The linkage mechanism 30 is connected to two interspaced support members (the interspaced second support member 12 and the fourth support member 14 as shown in FIG. 4) to rotate synchronously the two interspaced support members. At least one of the support members is provided between the two interspaced support members (as shown in FIG. 4, the third support member 13 is provided between the second support member 12 and the fourth support member 14 interspaced with the second support member 12). The two interspaced support members refer to two support members that are not adjacent to each other, and another support member is provided between the support members that are not adjacent to each other.

The first packaging mechanism 40 is disposed facing the plurality of rotation mechanisms 20, and the plurality of rotation mechanisms 20 are located on a side of the first packaging mechanism 40 and the plurality of support members. The first packaging mechanism 40 includes at least one first backplate 41 and at least one second backplate 42, and the first backplate 41 is movably connected to the second backplate 42. The first backplate 41 and the second backplate 42 are respectively connected to two interspaced support members (the interspaced first support member 11 and the fourth support member 14 as shown in FIG. 8), and at least one of the support members is disposed between the two interspaced support members (as shown in FIG. 8, a second support member 12 and a third support member 13 are disposed between the first support member 11 and the fourth support member 14 interspaced with the first support member 11).

The flexible display panel body 200 is located on another side of the plurality of support members away from the rotation mechanism 20 and the linkage mechanism 30, that is, the flexible display panel body 200 is located on a side of the support members away from the rotation mechanism 20 and the linkage mechanism 30.

The flexible display panel body 200 is in a flat state when the plurality of support members are in a first position. The plurality of support members are horizontally arranged and support the flexible display panel body 200, and the plurality of support members are horizontally arranged to form a flat surface to provide a flat bearing surface for the flexible display panel body 200. At this time, the first packaging mechanism 40 is unfolded to form a first included angle between the first backplate 41 and the second backplate 42, and the first included angle is 180 degrees. That is, the first backplate 41 and the second backplate 42 are horizontally disposed so as to shield the rotation mechanism 20 and the linkage mechanism 30 and prevent foreign matter such as dust from entering the hinge.

The flexible display panel body 200 is in a bent state when the plurality of support members are in a second position. The support members located at two ends are opposite to each other and disposed on a same side of the support members located in a middle, so that the plurality of support members are arranged in a U shape. The flexible display panel body 200 is fitted with a U-shaped outer surface of a U-shaped structure formed by the support members. At this time, a second included angle a is formed between the first backplate 41 and the second backplate 42 to shield the rotation mechanism 20 and the linkage mechanism 30, and wherein the second included angle a is less than the first included angle to hide the first packaging mechanism 40 in the U-shaped structure.

It should be noted that, with reference to FIGS. 4 and 5 in combination, the plurality of support members located at two ends refer to end support members of the plurality of support members rotatably connected to each other. As shown in FIGS. 4 and 5, the first support member 11 and the fourth support member 14 are support members located at two ends. The plurality of support members located in the middle refers to support members located in between the end support members of the plurality of support members. As shown in FIGS. 4 and 5, the second support member 12 and the third support member 13 are located between the first support member 11 and the fourth support member 14, thus, the second support member 12 and the third support member 13 are the support members located in the middle. When the plurality of support members are in the second position, the first support member 11 and the fourth support member 14 are located on a same side of the second support member 12 and the third support member 13, and the first support member 11 and the fourth support member 14 are disposed oppositely.

Further, the second position of the present application refers to a position to which the plurality of support members move when the flexible display panel 1000 is in the folded state. The first position refers to a position to which the plurality of support members move when the flexible display panel 1000 is in the unfolded state. When the plurality of support members move to the second position, an angle between two adjacent support members is greater than 90°. Thus, the plurality of support members integrally form a rounded U-shaped structure, and the flexible display panel body 200 is fitted with an outer surface of the U-shaped structure. Since a corner of the U-shaped structure is a rounded transition surface, the flexible display panel body 200 is not greatly pulled and is supported by a mechanism during a bending process while folding the flexible display panel 1000 outwardly. Thus, surfaces of the flexible display panel body 200 and the hinge 100 always fitted with each other before and after folding the flexible display panel 1000, and the surface of mechanisms of the hinge 100 always match a dimension of the flexible display panel body 200.

Next, the specific structure of each mechanism on the hinge 100 and the implementation mode of connection relationship of each mechanism are further described.

Figure 10:
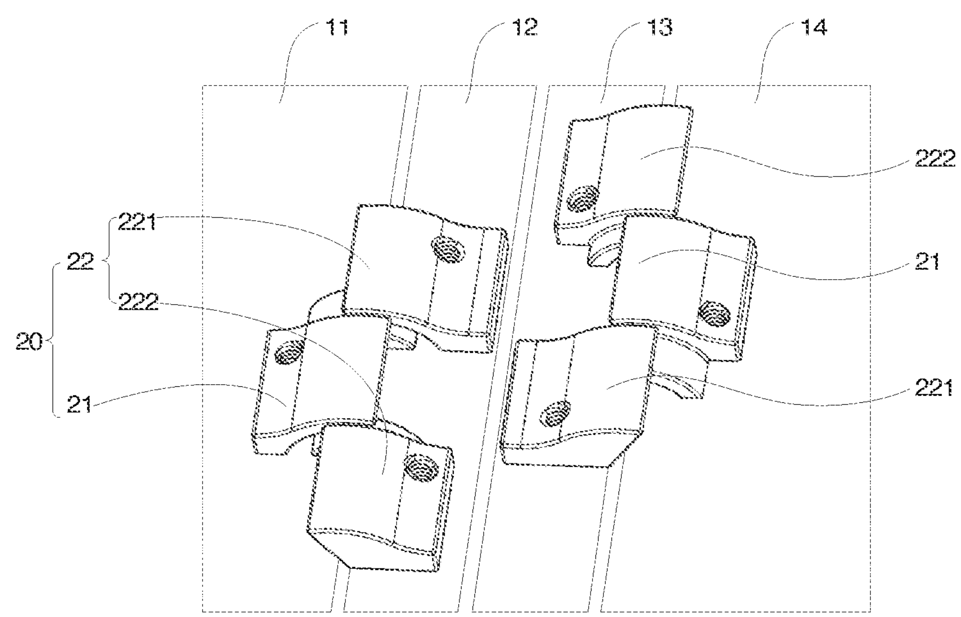
FIG. 10 is an enlarged schematic diagram of a rotation mechanism of FIG. 4.
Figure 11:
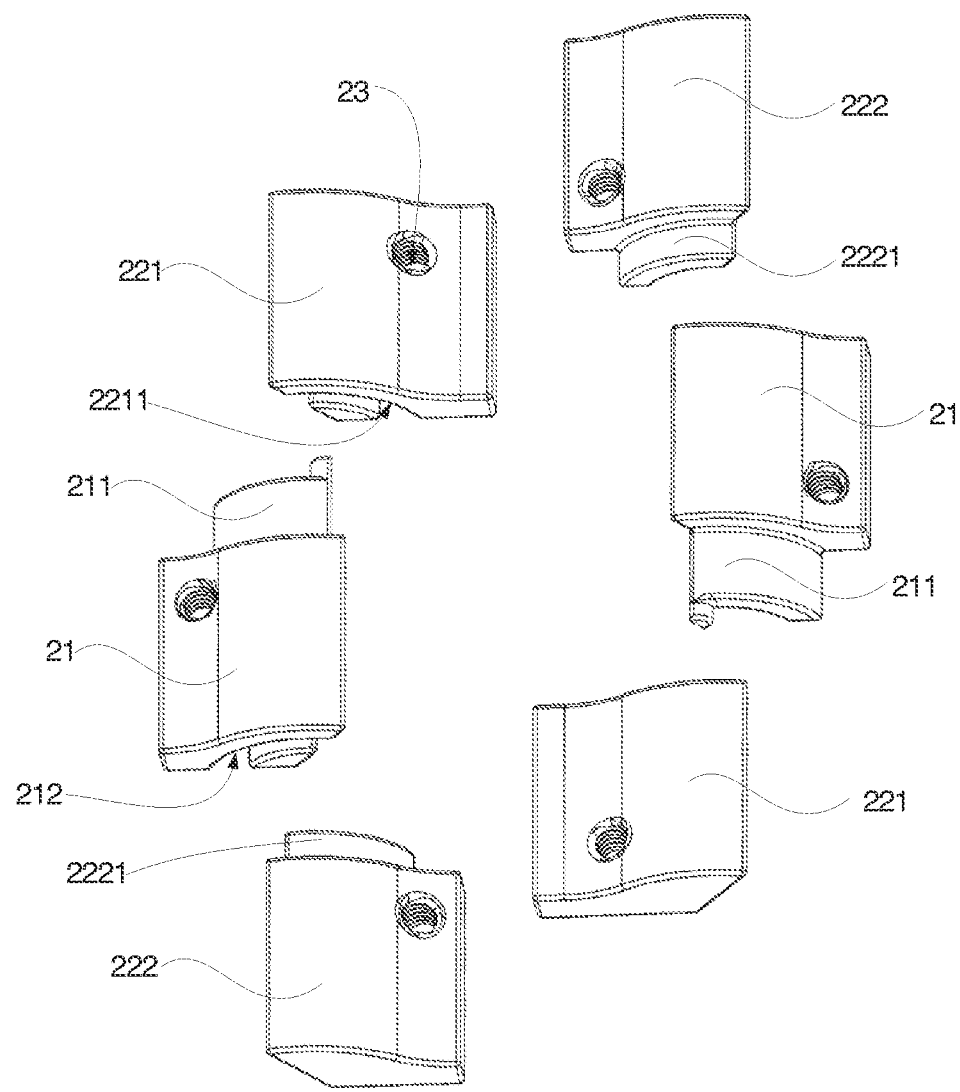
FIG. 11 is a detailed schematic diagram of the rotation mechanism of FIG. 10.
Figure 12:
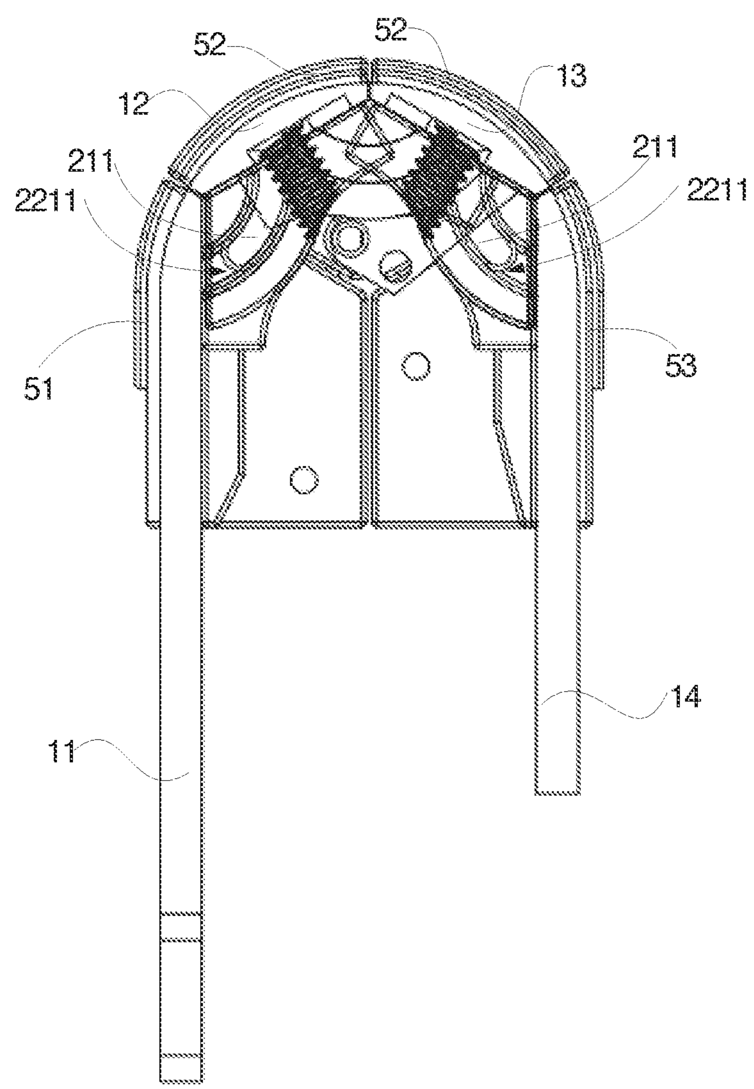
FIG. 12 and FIG. 13 are cross-sectional schematic diagrams of the rotation mechanism in a folded state according to an embodiment of the present application.
Figure 13:
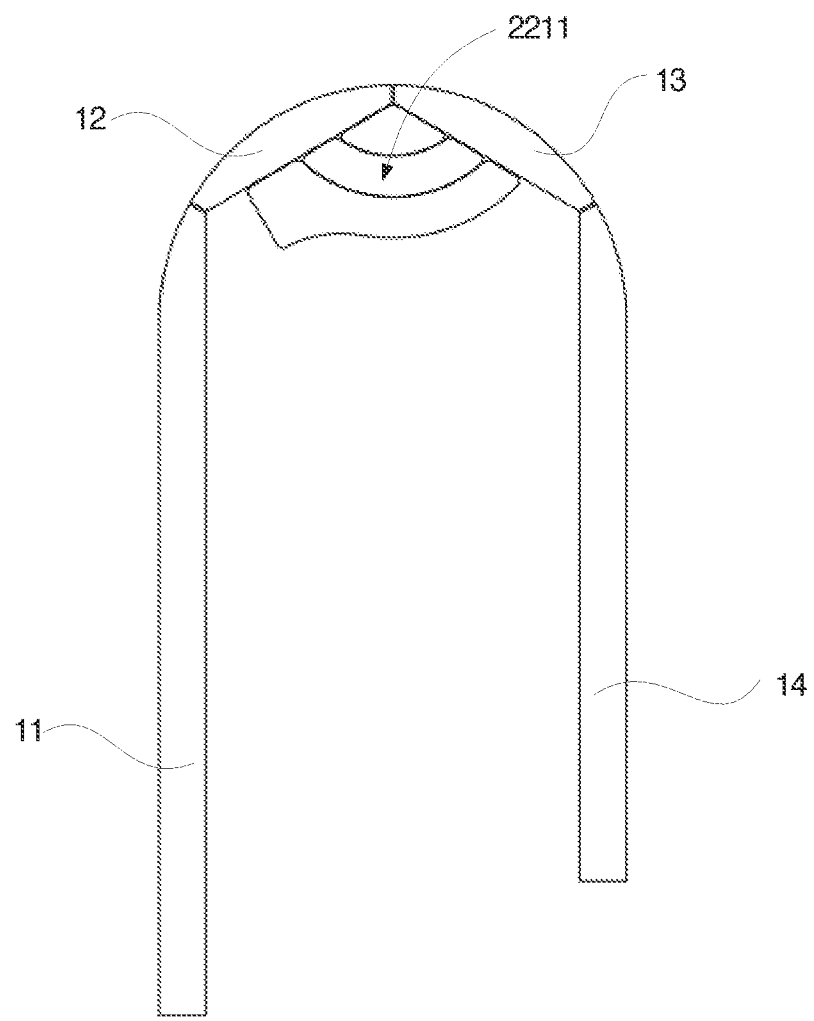

Specifically, referring to FIGS. 1 to 13, FIG. 10 is an enlarged schematic diagram of the rotation mechanism of FIG. 4, FIG. 11 is a detailed schematic diagram of the rotation mechanism of FIG. 10, and FIG. 12 and FIG. 13 are cross-sectional schematic diagrams of the rotation mechanism in the folded state according to an embodiment of the present application. The rotation mechanism 20 includes a first rotation member 21 and a second rotation assembly 22, wherein the first rotation member 21 and the second rotation assembly 22 are respectively connected to two adjacent support members, and the first rotation member 21 is movably connected to the second rotation assembly 22.

Specifically, the second rotation assembly 22 includes a second rotation member 221 and a third rotation member 222 disposed at interval, wherein the second rotation member 221 and the third rotation member 222 are fixedly connected to one of two adjacent support members, and the first rotation member 21 is fixedly connected to another one of the two adjacent support members. Specifically, fixed connection includes a fixing means by pins, bonding, welding, screws, and the like. For example, the first rotation member 21, the second rotation member 221, and the third rotation member 222 of the present embodiment may be designed with screw holes 23 and fixed to corresponding support members by screws. The second rotation member 221 and the third rotation member 222 are movably connected to the first rotation member 21.

Specifically, a first arcuate lug 211 is provided at one end of the first rotation member 21, and a first arcuate chute 212 is provided at another end of the first rotation member 21. The first arcuate lug 211 and the first arcuate chute 212 are located at opposite ends of the first rotation member 21. A second arcuate chute 2211 is provided on one of the second rotation member 221 and the third rotation member 222, and a second arcuate lug 2221 is provided on another one of the second rotation member 221 and the third rotation member 222. In this embodiment, take an example that the second rotation member 221 is provided with a second arcuate chute 2211, and the third rotation member 222 is provided with a second arcuate lug 2221. The first arcuate lug 211 of the first rotation member 21 is slidably mounted to the second arcuate chute 2211 of the second rotation member 221, and the second arcuate lug 2221 of the third rotation member 222 is slidably mounted to the first arcuate chute 212 of the first rotation member 21.

When the plurality of support members move to the second position, the first arcuate lug 211 of the first rotation member 21 slides into the second arcuate chute 2211 of the second rotation member 221, and the second arcuate lug of the third rotation member 222 slides into the first arcuate chute 212 of the first rotation member 21. A cross-sectional schematic diagram of the rotation mechanism in the folded state is shown in FIGS. 12 and 13. FIGS. 12 and 13 are illustrated by the first arcuate lug 211 sliding into the second arcuate chute 2211, and FIG. 13 only shows the second arcuate chute 2211.

Optionally, on the two adjacent support members, a number of the rotation mechanisms 20 is at least 2 to ensure stability of a rotational connection between the two adjacent support members. The two rotation mechanisms 20 are respectively provided in a region at opposite ends of the two adjacent support members to provide an effective distance between the two rotation mechanisms 20, and to further ensure the stability of the rotational connection between the two adjacent support members. However, the present application is not limited thereto, and a specific number and a position of the rotation mechanism 20 of the present application may be determined according to a length of the support member and a spatial layout of the support member.

Figure 14:
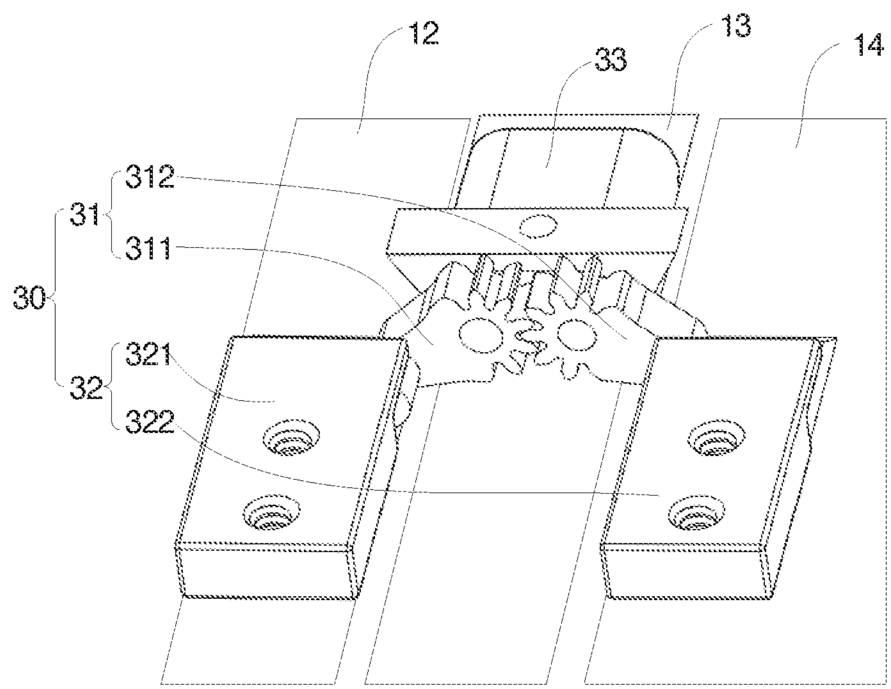
FIG. 14 is an enlarged schematic diagram of a linkage mechanism of FIG. 4.
Figure 15:
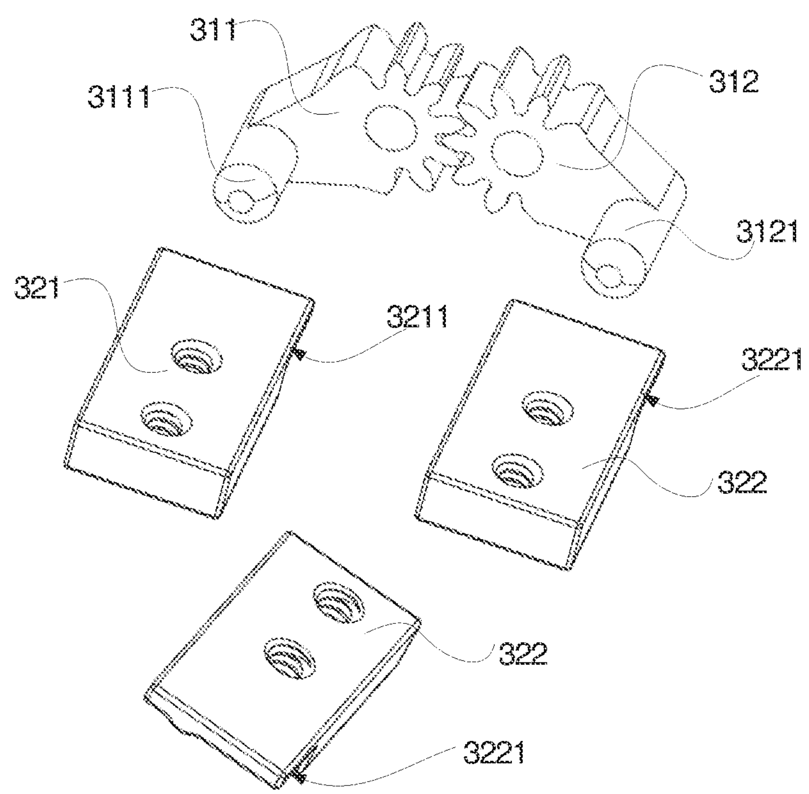
FIG. 15 is a detailed schematic diagram of the linkage mechanism of FIG. 14.
Figure 16:
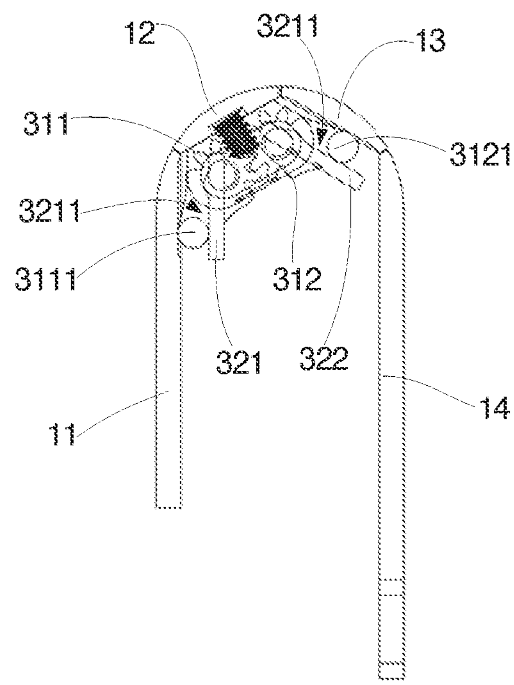
FIG. 16 is a cross-sectional schematic diagram of the linkage mechanism in the folded state according to an embodiment of the present application.

Referring to FIG. 14 to FIG. 16, FIG. 14 is an enlarged schematic diagram of the linkage mechanism of FIG. 4, FIG. 15 is a detailed schematic diagram of the linkage mechanism of FIG. 14, and FIG. 16 is a cross-sectional schematic diagram of the linkage mechanism in the folded state according to an embodiment of the present application. The linkage mechanism 30 includes a linkage assembly 31. The linkage assembly 31 includes a first linkage member 311 and a second linkage member 312. The first linkage member 311 is connected to one of the two interspaced support members, and the second linkage member 312 is connected to another one of the two interspaced support members. The first linkage member 311 is synchronously connected to the second linkage member 312.

The linkage mechanism 30 further includes a connection assembly 32, and the connection assembly 32 includes a first connection member 321 and a second connection member 322. The first connection member 321 is connected to the first linkage member 311 and one of the two spaced interlocked support members, and the second connection member 322 is connected to the second linkage member 312 and another one of the two interspaced support members.

Optionally, the linkage mechanism 30 further includes a synchronization assembly 33 fixedly connected to the support member between the two interspaced support members. The synchronization assembly 33 is also movably connected to the first linkage member 311 and the second linkage member 312 to synchronously rotate the first linkage member 311 and the second linkage member 312. The first connection member 321 is slidably connected to the first linkage member 311, and the second connection member 322 is slidably connected to the second linkage member 312. The first connection member 321 and the second connection member 322 are fixedly connected to a corresponding support member by a pin, bonding, welding, a screw, and the like. In this manner, a synchronous rotation of the first linkage member 311 and the second linkage member 312 may cause a synchronous rotation of the interspaced support members and the support member between the two interspaced support members.

Specifically, the first connection member 321 is provided with a first chute 3211, the second connection member 322 is provided with a second chute 3221. The first linkage member 311 includes a first gear, the second linkage member 312 includes a second gear, wherein the first gear meshes with the second gear. The first gear is provided with a first cylindrical shaft 3111, the second gear is provided with a second cylindrical shaft 3121. The first cylindrical shaft 3111 is slidably mounted in the first chute 3211, and the second cylindrical shaft 3121 is slidably mounted in the second chute 3221. The linkage mechanism forms a cross-sectional schematic diagram shown in FIG. 16 when the plurality of support members are moved to the second position.

Optionally, a number of the linkage mechanisms 30 is at least 2 to ensure stable linkage of the two interspaced support members and the support member between the two interspaced support members. But the present application is not limited thereto, and the specific number of the linkage mechanisms 30 of the present application may be determined according to the length of the support member and the spatial layout of the support member.

Figure 17:
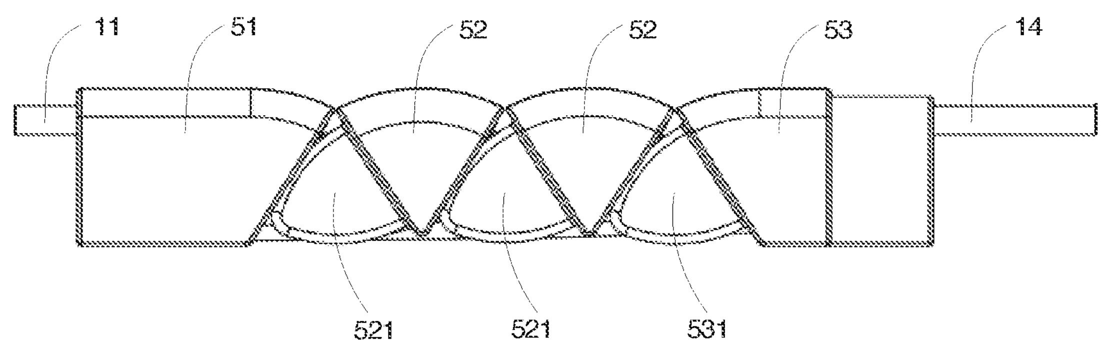
FIG. 17 is an enlarged schematic diagram of a second packaging mechanism of FIG. 4.
Figure 18:
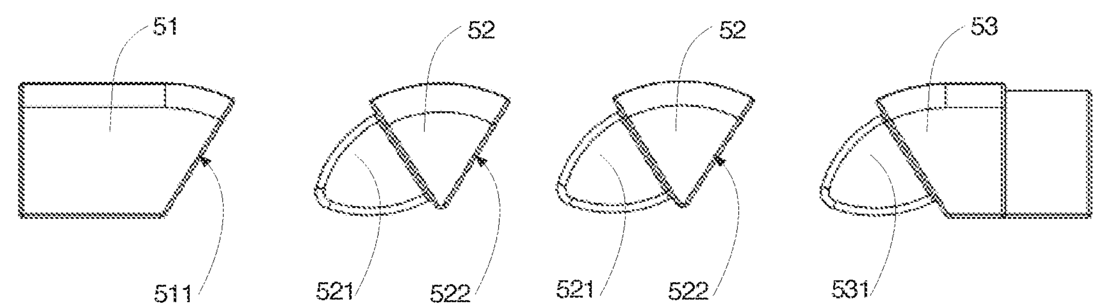
FIG. 18 is a detailed schematic diagram of the second packaging mechanism of FIG. 17.
Figure 19:
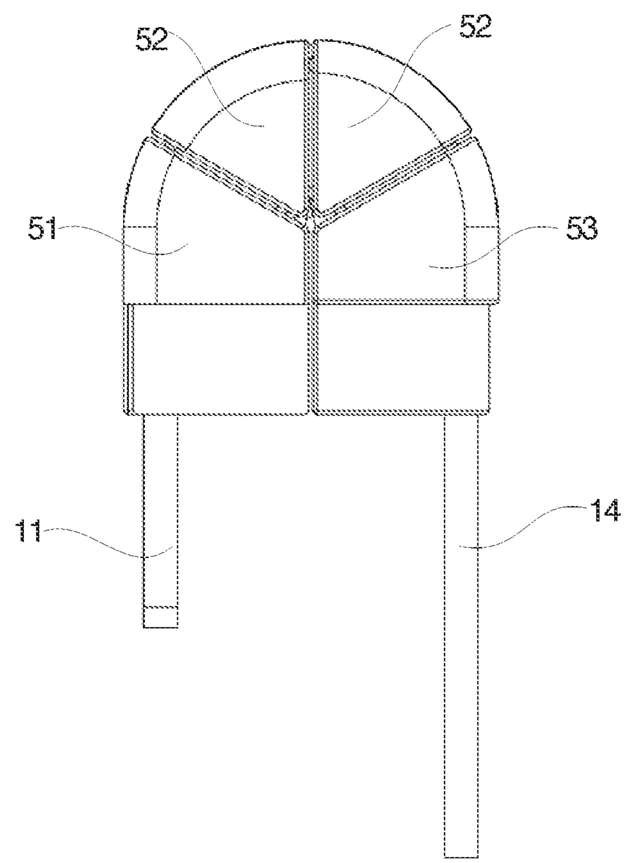
FIG. 19 is a schematic diagram of the second packaging mechanism in the folded state according to an embodiment of the present application.
Figure 20:
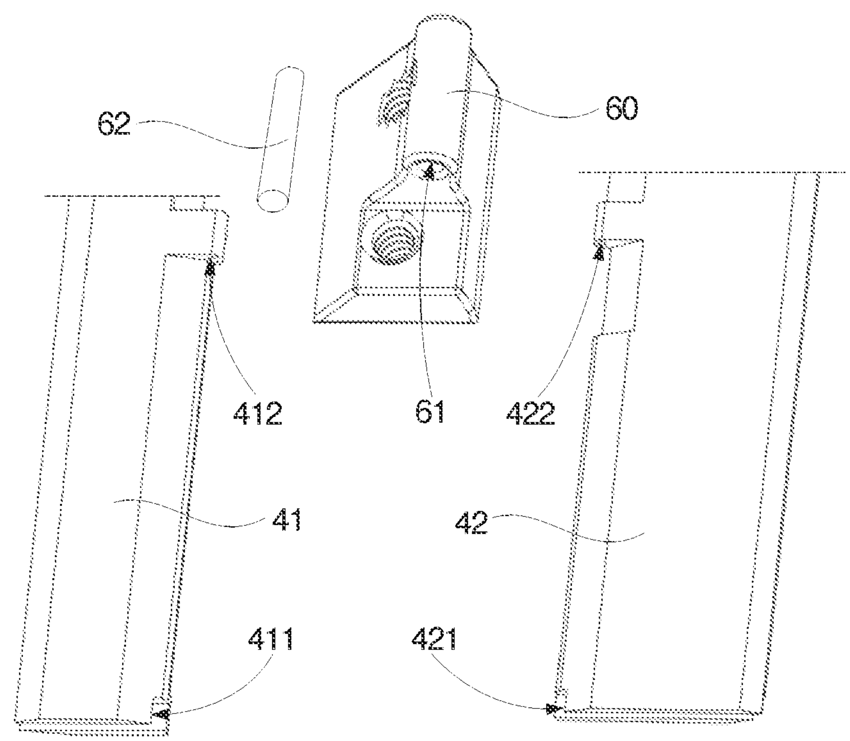
FIG. 20 is a detailed schematic diagram of the first packaging mechanism of FIG. 4.

Referring to FIGS. 4 to 20, FIG. 17 is an enlarged schematic diagram of the second packaging mechanism of FIG. 4, FIG. 18 is a detailed schematic diagram of the second packaging mechanism of FIG. 17, FIG. 19 is a schematic diagram of the second packaging mechanism in the folded state according to an embodiment of the present application, and FIG. 20 is a detailed schematic diagram of the first packaging mechanism of FIG. 4. The first packaging mechanism 40 includes at least one first backplate 41 and at least one second backplate 42, and the first backplate 41 is movably connected to the second backplate 42. The first backplate 41 and the second backplate 42 are respectively connected to the two interspaced support members, and rotation axes of the first backplate 41 and the second backplate 42 are overlapped. Thus, the first backplate 41 and the second backplate 42 may rotate relative to the support member.

Specifically, the hinge 100 further includes a second packaging mechanism 50 disposed at an end of the plurality of support members, and the second packaging mechanism 50 includes a plurality of packaging members. Each packaging member is fixedly connected to a corresponding support member, and the second packaging mechanism 50 rotates as the support member rotates. The second packaging mechanism 50 may protect mechanisms in the hinge 100 at a side surface of the hinge 100. The second packaging mechanism cooperates with the first packaging mechanism

40 to effectively protect the hinge 100, so that no mechanisms in the hinge 100 are exposed before and after folding the hinge 100.

Optionally, the plurality of packaging members include a first packaging member 51, a second packing member 52, and a third packing member 53, wherein the second packing member 52 is located between the first packing member 51 and the third packing member 53. The first packaging member 51 is provided with a first arcuate groove 511, and the second packaging member 52 is provided with a first arcuate protrusion 521 and a second arcuate groove 522. The third packaging member 53 is provided with a second arcuate protrusion 531. The first arcuate protrusion 521 is slidably mounted in the first arcuate groove 511 and the second arcuate protrusion 531 is slidably mounted in the second arcuate groove 522.

It will be understood that when two or more second packaging members 52 are disposed between the first packaging member 51 and the third packaging member 53, the plurality of second packaging members 52 are also slidably connected to each other. At this time, the first arcuate protrusion 521 of one packaging member 52 of two adjacent second packaging members 52 is slidably mounted in the second arcuate groove 522 provided on another one of the two adjacent second packaging members 52.

The first backplate 41 and the second backplate 42 are slidably connected to the packaging members at an end of the two interspaced support members, respectively. That is, the first backplate 41 and the second backplate 42 are slidably connected to a corresponding packaging member respectively, and the packaging member is connected to a corresponding support member respectively. Thus, the first backplate 41 and the second backplate 42 are slidably connected to the corresponding support member indirectly. A rotation of the support member drives a rotation of the corresponding packaging member, and the rotation of the packaging member drives a rotation of the first backplate 41 and the second backplate 42, so that the first backplate 41 and the second backplate 42 may shield the rotation mechanism 20 and the linkage mechanism 30.

Specifically, the packaging member slidably connected to the first plate 41 and the second backplate 42 is provided with a boss (a first boss 512 on the first packaging member 51 and a second boss 532 on the third packaging member 53 as shown in FIG. 7). Two ends of the first backplate 41 and the second backplate 42 are respectively provided with a linear groove (a first linear groove 411 on the first backplate 41 and a second linear groove 421 on the second backplate 42 as shown in FIG. 7). The boss slidably fits with a corresponding linear groove to achieve a sliding connection between the first backplates 41 and a corresponding packaging member, and between the second backplate 42 and a corresponding packaging member. Thus, the first packaging mechanism 40 and the second packaging mechanism 50 are both rotated synchronously with a rotation of the plurality of support members.

Optionally the hinge 100 further includes a first rotation fixing member 60 fixedly connected to the support member between the two interspaced support members. The first backplate 41 and the second backplate 42 are movably connected to the first rotation fixing member 60 to improve a stable rotation of the first packaging mechanism 40 and a reliable connection of the support member.

When the plurality of support members move to the second position, the plurality of packaging members of the second packaging mechanism 50 rotate with each other, and the first backplate 41 and the second backplate 42 of the first packaging mechanism 40 also rotate relatively with a rotation of the second packaging mechanism 50. Thus, the first backplate 41 and the second backplate 42 are moved to a second included angle to be hidden in the U-shaped structure formed by the plurality of support members.

When the plurality of support members move to the first position, the plurality of packaging members of the second packaging mechanism 50 rotate with each other to form a complete side package structure. The first backplate 41 and the second backplate 42 of the first packaging mechanism 40 also rotate relative to each other with a rotation of the second packaging mechanism 50. Thus, the first backplate 41 and the second backplate 42 are moved to horizontal position to form a first included angle, wherein the first included angle is 180°. The first backplate 41 and the second backplate 42 form a flat surface to shield the rotation mechanism 20 and the linkage mechanism 30. Therefore, before and after the folding the flexible display panel 1000, the first packaging mechanism 40 and the second packaging mechanism 50 may effectively protect inner members of the hinge 100 from being exposed.

Still referring to FIGS. 4 to 19, the structure and working principle of the hinge 100 are further described with reference to an example in which the number of the support members is 4. The plurality of support members includes a first support member 11, a second support member 12, a third support member 13, and a fourth support member 14. The rotation mechanism 20 is provided between the first support member 11 and the second support member 12 adjacent to the first support member 11, between the second support member 12 and the third support member 13 adjacent to the second support member 12, and between the third support member 13 and the fourth support member 14 adjacent to the third support member 13. The linkage mechanism 30 is provided between the first support member 11 and the third support member 13 interspaced with the first support member 11, and between the second support member 12 and the fourth support member 14 interspaced with the second support member 12. The second support member 12 is provided between the first support member 11 and the third support member 13 interspaced with the first support member 11, and the third support member 13 is provided between the second support member 12 and the fourth support member 14 interspaced with the second support member 12.

Specifically, the rotation mechanism 20 provided between the first support member 11 and the second support member 12 will be described as an example. The rotation mechanism 20 includes a first rotation member 21 and a second rotation assembly 22, wherein the second rotation assembly 22 includes a second rotation member 221 and a third rotation member 222. The first rotation member 21 is fixed to the first support member 11, the second rotation member 221 and the third rotation member 222 are fixed to the second support member 12, and the first rotation member 21 is slidably connected to the third rotation member 222 and the second rotation member 221.

Optionally, a first arcuate lug 211 and a first arcuate chute 212 are provided on the first rotation member 21, a second arcuate lug 2221 is provided on the third rotation member 222, and a second arcuate chute 2211 is provided on the second rotation member 221. The first arcuate lug 211 are slidably cooperated with the second arcuate chute 2211 so that the first rotation member 21 and the second rotation member 221 may relatively slide. The second arcuate lug 2221 and the first arcuate chute 212 are slidably cooperated so that the first rotation member 21 and third rotation member 222 may be relatively slide. This allows a relative rotation between the first support member 11 and the second support member 12, and a rotation center is a center of an arc of each arcuate chute or arcuate lug on the rotation mechanism 20.

The structure and working principle of the rotation mechanism 20 provided between the second support member 12 and the third support member 13, and between the third support member 13 and the fourth support member 14 may be described with reference to the description of the rotation mechanism 20 between the first support member 11 and the second support member 12. It will be omitted here.

Optionally, the rotation mechanisms 20 between each adjacent support members are staggered, for example, the rotation members of the rotation mechanism 20 between the first support member 11 and the second support member 12 staggers with the rotation members of the rotation mechanism 20 between the third support member 13 and the fourth support member 14 to avoid interference between the rotation mechanisms 20 and rationally utilize a limited space on the support member.

Further, the linkage mechanism 30 between the second support member 12 and the fourth support member 14 is described as an example. The linkage 30 includes a linkage assembly 31, a connection assembly 32, and a synchronization assembly 33. The linkage assembly 31 is movably connected to the third support member 13. The connection assembly 32 is fixedly connected to the second support member 12 and the fourth support member 14, respectively, and is slidably connected to the linkage assembly 31. The synchronization assembly 33 is fixedly connected to the third support member 13, and the linkage assembly 31 is movably connected to the synchronization assembly 33. The fixed connection above includes a fixing means by a pin, an adhesive, a welding, a screw, and the like.

Optionally, the linkage assembly 31 includes a first linkage member 311 and a second linkage member 321, wherein the first linkage member 311 includes a first gear, the second linkage member 312 includes a second gear, and the first gear meshes with the second gear. The first linkage member 311 and the second linkage member 321 are movably connected to the synchronization assembly 33. Thus, the first linkage member 311 and the second linkage member 312 may rotate synchronously with respect to the third support member 13. At an end away from a meshing position, the first gear is provided with a first cylindrical shaft 3111 and the second gear is provided with a second cylindrical shaft 3121.

The connection assembly 32 includes a first connection member 321 and a second connection member 322, wherein the first connection member 321 is provided with a first chute 3211, and the second connection member 322 is provided with a second chute 3221. The first cylindrical shaft 3111 is slidably mounted in the first chute 3211 and the second cylindrical shaft 3121 is slidably mounted in the second chute 3221, thereby ensuring the first cylindrical shaft 3111 to slide and rotate in the first chute 3211, and the second cylindrical shaft 3121 to slide and rotate in the second chute 3221. At the same time, since the first gear and the second gear are meshed and rotate with respect to the third support member 13, a synchronously linkage among the second support member 12, the third support member 13, and the fourth support member 14 is realized. The second support member 12 and the fourth support member 14 always maintain a symmetrically rotational movement with respect to the third support member 13.

Optionally, a stopper member (not shown) may be provided on the first connection member 321 and the second connection member 322. The stopper member is located at two ends of the first chute 3211 and the second chute 3221, and integrally formed with the first connection member 321 and the second connection member 322. Certainly, the present application is not limited thereto, and the stopper member of the present application may be provided separately. The stopper member is used to limit a sliding distance of the first cylindrical shaft 3111 and the second cylindrical shaft 3121 in a corresponding chute to position a rotational angle of the two adjacent support members.

Correspondingly, the structure and the linkage principle of the linkage mechanism 30 between the first support member 11 and the third support member 13 interspaced with the first support member 11 are same as the structure and the linkage principle of the linkage mechanism 30 between the second support member 12 and the fourth support member 14 interspaced with the second support member 12. A linkage among the second support member 12, the third support member 13, and the first support member 11 is realized, and the first support member 11 and the third support member 13 always maintain a symmetrically rotational movement relative to the second support member 12.

Optionally, the plurality of linkage mechanisms 30 are staggered to avoid interference among the plurality of linkage mechanisms 30 and to rationally utilize the limited space on the support member.

Further, with operations of the rotation mechanism 20 and the linkage mechanism 30, when the first support member 11 rotates relative to the second support member 12, a relative sliding motion is also generated between the first support member 11 and the third support member 13, and the third support member 13 is urged to rotate relative to the second support member 12 by the sliding motion. Correspondingly, when the fourth support member 14 rotates relative to the third support member 13, a relative sliding motion is also generated between the fourth support member 14 and the second support member 12, and the second support member 12 is urged to rotate relative to the third support member 13 by the sliding motion. Accordingly, the first support member 11, the second support member 12, the third support member 13, and the fourth support member 14 in the hinge 100 may act synchronously in this process.

Therefore, when the first support member 11, the second support member 12, the third support member 13, and the fourth support member 14 move to a second position, an angle between two adjacent support members may be equal, and the angle may be greater than 90°. At this time, the first support member 11, the second support member 12, the third support member 13, and the fourth support member 14 are arranged in a U shape, wherein the first support member 11 and the fourth support member 14 are disposed oppositely.

Further, when the first support member 11, the second support member 12, the third support member 13, and the fourth support member 14 are moved to a first position, an angle between two adjacent support members may be still equal, and the angle may be 180°. At this time, the first support member 11, the second support member 12, the third support member 13, and the fourth support member 14 are horizontally arranged and provide a flat bearing surface for the flexible display panel body 200.

The structure of the first packaging mechanism 40 and the second packaging mechanism 50 will be described as follows.

The first packaging mechanism 40 is movably connected to a first rotation fixing member 60, and the first rotation fixing member 60 is fixedly connected to the second support member 12 or the third support member 13. In this embodiment, the first rotation fixing member 60 being fixedly connected to the second support member 12 will be described as an example, and the first backplate 41 and the second backplate 42 are movably connected to the first rotation fixing member 60.

Specifically, as shown in FIG. 20, a first shaft hole 412 is defined in the first backplate 41, a second shaft hole 422 is defined in the second backplate 42, and a third shaft hole 61 is defined in the first rotation fixing member 60. Axes of the first shaft hole 412, the second shaft hole 422, and the third shaft hole 61 are overlapped. The first shaft hole 412, the second shaft hole 422, and the third shaft hole 61 may be connected to each other through a rotating shaft 62 to form a shaft hole fit. Thus, rotation axes of the first backplate 41 and the second backplate 42 are overlapped, and the first backplate 41 and the second backplate 42 may rotate with respect to the first rotation fixing member 60.

Referring to FIG. 7, the first backplane 41 and the second backplane 42 are also movably connected to the second packaging mechanism 50. The second packaging mechanism 50 includes a first packaging member 51, two second packaging members 52, and a third packaging member 53. The first packaging member 51 is fixedly connected to an end of the first support member 11. The two second packaging members 52 are fixedly connected to an end of the second support member 12 and the third support member 13, respectively. The third packaging member 53 is fixedly connected to an end of the fourth support member 14. Thus, a synchronous rotation of each support member drives a rotation of the second packaging mechanism 50. A number of the second packaging mechanisms 50 is 2, and the second packaging mechanisms 50 are positioned at opposite ends of each support member.

Specifically, a first boss 512 is provided on a side of the first packing member 51 facing the first backplate 41, and a second boss 532 is provided on a side of the third packing member 53 facing the second backplate 42. The first boss 512 and the second boss 532 may be straight cylinders. A first linear groove 411 is provided at opposite ends of the first backplate 41, and second linear groove 421 is provided at opposite ends of the second backplate 42. The first boss 512 is slidably mounted in the first linear groove 411, thus, the first backplate 41 rotates relative to the second support member 12 as the first packaging member 51 rotates. The second boss 532 is slidably mounted in the second linear groove 421, thus, the second backplate 42 rotates relative to the second support member 12 as the third packaging member 53 rotates.

As described above, when the first support member 11, the second support member 12, the third support member 13, and the fourth support member 14 move to the second position, the plurality of packaging members of the second packaging mechanism 50 rotate with respect to each other so that the first arcuate protrusion 521 of the second packaging member 52 adjacent to the first packaging member 51 is hidden into the first arcuate groove 511, the first arcuate protrusion 521 of the second packaging member 52 adjacent to the third packaging member 53 is hidden into the second arcuate groove 522 of the second packaging member 52 adjacent to the first packaging member 51, and the second arcuate protrusion 531 of the third packaging member 53 is hidden into the second arcuate groove 522 of the second packaging member 52 adjacent to the third packaging member 53, forming a folded state as shown in FIG. 19. The first backplate 41 and the second backplate 42 of the first packaging mechanism rotate with respect to the second support member 12 as the second packaging mechanism 50 rotates. Thus, the first backplate 41 and the second backplate 42 are disposed at the second included angle and hidden in a U-shaped structure formed by the plurality of support members.

When the first support member 11, the second support member 12, the third support member 13, and the fourth support member 14 are moved to the first position, the plurality of packaging members of the second packaging mechanism 50 rotate with respect to each other so that an arcuate protrusion of the packaging member is rotated out of the arcuate groove of the adjacent packaging member. For example, the second arcuate protrusion 531 of the third packaging member 53 is rotated out of the second arcuate groove 522 of the adjacent second packaging member 52. The first backplate 41 and the second backplate 42 of the first packaging mechanism 40 rotate with respect to the second support member 12 as the second packaging mechanism 50 rotates, finally forming a flat surface in a horizontal arrangement. Thus, before and after folding the flexible display panel 1000, the first packaging mechanism 40 and the second packaging mechanism 50 may effectively protect inner members of the hinge 100 from being exposed.

In an embodiment, the flexible display panel 1000 further includes a first fixing member 70 connected to the hinge 100 and the housing 300. Specifically, the first support member 11 and the fourth support member 14 are fixedly connected to a corresponding housing 300 through the first fixing member 70, respectively.

Optionally, the first fixing member 70 may be integrally formed with a corresponding support member or the housing 300, for example, the first fixing member 70 is integrally formed with the first support member 11, and then the first fixing member 70 is fixedly connected with the housing 300. The fixed connection above includes a fixing means by a pin, an adhesive, a welding, a screw, and the like.

Figure 21:
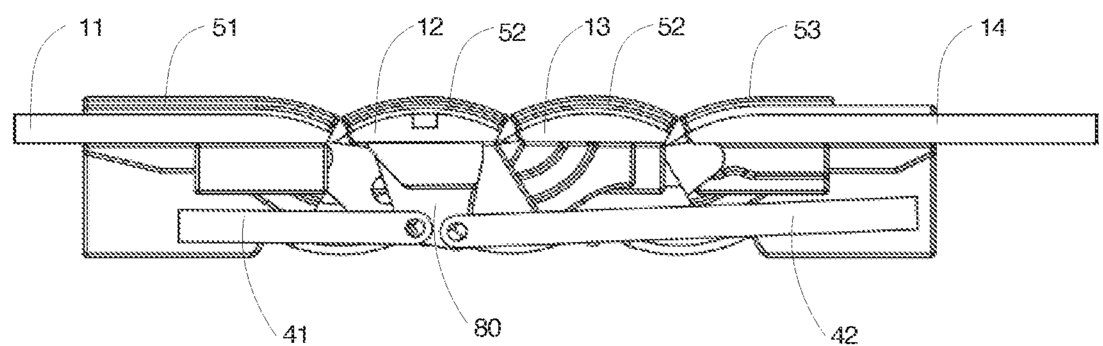
FIG. 21 is another cross-sectional schematic diagram of the first packaging mechanism in an unfolded state according to an embodiment of the present application.
Figure 22:
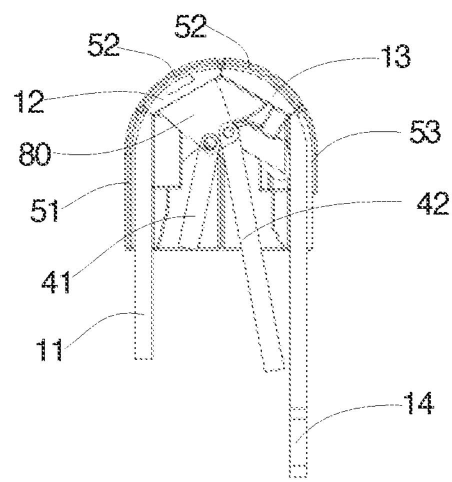
FIG. 22 is another cross-sectional schematic diagram of the first packaging mechanism in a folded state according to an embodiment of the present application.

In an embodiment, referring to FIGS. 21 and 22, FIG. 21 is another cross-sectional schematic diagram of the first packaging mechanism in the unfolded state according to an embodiment of the present application, and FIG. 22 is another cross-sectional schematic diagram of the first packaging mechanism in the folded state according to an embodiment of the present application. The hinge 100 further includes a second rotation fixing member 80 fixedly connected to the second support member 12 or the third support member 13. The second rotation fixing member 80 is movably connected to the first backplate 41 and the second backplate 42 at different positions. As so, rotation axes of the first backplate 41 and the second backplate 42 are overlapped, so that the second rotation fixing member 80 achieves a same effect as the first rotation fixing member 60. Other descriptions may refer to the above-mentioned embodiments, which will not be repeated here.

It should be noted that the embodiment of the present application only takes the hinge 100 including four support members as an example for description, but the present application is not limited thereto. The hinge 100 of the present application may be further provided with more support members, for example, 5 support members, 6 support members, and the like. When more support members are provided, the flexible display panel 1000 of the display device may be also curled.

The rotation mechanism 20 and the linkage mechanism 30 of the hinge 100 of the present application is not limited to the above-described embodiment. By the operation of the rotation mechanism 20 and the linkage mechanism 30, the hinge 100 of the present application may form a flat support surface at the first position and a U-shaped surface at the second position. For example, the rotation mechanism 20 of the hinge 100 of the present application may achieve a rotation between two adjacent support members by a hinge, a connecting rod, a gear, or the like.

In an embodiment, the present application further provides an electronic device including a flexible display panel of the above-described embodiments, so that the electronic device may be folded, curled, and the like. A surface of a hinge mechanism of the flexible display panel matches a size of a flexible display panel body before and after folding or curling the electronic device. The electronic device may be an electronic product such as a mobile phone, a tablet, and the like.

Based on a same inventive concept, the present application further provides a hinge. The hinge is the one on the flexible display panel in the above embodiments, which is not described here again.

According to the above-described embodiments, it should be understood that:

The present application provides a flexible display panel, an electronic device, and a hinge. The flexible display panel includes a hinge and a flexible display panel body, and the hinge includes a plurality of support members, a rotation mechanism, a linkage mechanism, a first packaging mechanism, and a second packaging mechanism rotatably connected sequentially. The rotation mechanism is disposed on a side of the plurality of support members, and each rotation mechanism is connected to two adjacent support members to rotate the two adjacent support members relatively. The linkage mechanism is disposed on a side of the plurality of support members and is connected to two interspaced support members to rotate the two interspaced support members synchronously. The first packaging mechanism is disposed on a side of the rotation mechanism away from the plurality of support members. The first packaging mechanism includes at least one first backplate and at least one second backplate, the first backplate is movably connected to the second backplate, and the first backplate and the second backplate are respectively connected to the two interspaced support members. At least one support member is provided between the two interspaced support members. The second packaging mechanism is disposed at an end of the plurality of support members, and the second packaging mechanism includes a plurality of packaging members, each packaging member is fixedly connected to a corresponding support member. The flexible display panel body is located on a side of the plurality of support members away from the rotation mechanism and the linkage mechanism. When the plurality of support members are moved to a first position by the rotation mechanism and the linkage mechanism, the plurality of support members are horizontally arranged to provide a flat bearing surface for the flexible display panel body to jointly support the flexible display panel body. The first packaging mechanism and the second packaging mechanism are unfolded, a first included angle is formed between the first backplate and the second backplate to shield the rotation mechanism and the linkage mechanism, and the second packaging is sufficient to protect a side of the hinge. When the plurality of support members move to a second position, the flexible display panel body is in a bent state, and the support members located at two ends are opposite to each other and disposed on a same side of the support members located in a middle. The plurality of support members are arranged in a U shape, and the plurality of support members form a U-shape surface to fit with a bottom of the flexible display panel body. A second included angle is formed between the first backplate and the second backplate to shield the rotation mechanism, and the second included angle is less than the first included angle so as to hide the first packaging mechanism in a U-shaped structure. Thus, the packaging mechanism may shield and protect inner mechanisms of the hinge before and after folding the flexible display panel.

In the above-described embodiments, the descriptions of the various embodiments are each focused, and portions of some embodiments that are not detailed may be referred to the related descriptions of other embodiments.

The above described embodiments of the present application are described in detail, and principles and embodiments of the present application are described by using specific examples herein. The above described embodiments are merely intended to help understand the technical solutions and core ideas of the present application. Those ordinary skilled in the art will appreciate that they may still modify the technical solutions described in the foregoing embodiments, or equivalently replace some of the technical features therein. These modifications or substitutions do not deviate the nature of the scope of the embodiments of the present application.

What is claimed is:

1. A flexible display panel, comprising a hinge and a flexible display panel body, the hinge comprising:

a plurality of support members;

a plurality of rotation mechanisms disposed on a side of the plurality of support members, each of the rotation mechanisms being connected to two of the support members adjacent to each other to rotate the two adjacent support members relative to each other; and a first packaging mechanism disposed facing the plurality of rotation mechanisms, the plurality of rotation mechanisms being located among the first packaging mechanism and the plurality of support members, the first packaging mechanism comprising at least one first backplate and at least one second backplate, the first backplate being movably connected to the second backplate, the first backplate and the second backplate being respectively connected to two interspaced support members, and at least one support member being provided between the two interspaced support members;

wherein the flexible display panel body is located on another side of the plurality of support members away from the rotation mechanism, the flexible display panel body is in a flat state when the plurality of support members are in a first position, the plurality of support members are horizontally arranged and support the flexible display panel body, and the first packaging mechanism is unfolded to form a first included angle between the first backplate and the second backplate to shield the rotation mechanism;

wherein, when the plurality of support members are in a second position, the flexible display panel body is in a bent state, the plurality of support members at two ends are arranged opposite to each other and disposed on a same side of the support members in a middle, and wherein a second included angle is defined between the first backplate and the second backplate to shield the rotation mechanism, and the second included angle is less than the first included angle;

wherein the hinge further comprises a second packaging mechanism, the second packaging mechanism is disposed at an end of the plurality of support members and comprises a plurality of packaging members, and each packaging member is fixedly connected with a corresponding support member.

2. The flexible display panel according to claim 1, wherein the first backplate and the second backplate are slidably connected to the packaging member at an end of the two interspaced support members, respectively.

3. The flexible display panel according to claim 2, wherein a boss is defined on the packaging member slidably connected to the first backplate and the second backplate, a linear groove is respectively defined at each of two ends of the first backplate and the second backplate, and the boss is slidably fitted to a corresponding linear groove.

4. The flexible display panel according to claim 1, wherein the plurality of packaging members comprise a first packaging member, a second packaging member, and a third packaging member, the second packaging member is located between the first packaging member and the third packaging member, a first arcuate groove is defined on the first packaging member, a first arcuate protrusion and a second arcuate groove are defined on the second packaging member, and a second arcuate protrusion is defined on the third packaging member, the first arcuate protrusion is slidably mounted in the first arcuate groove, and the second arcuate protrusion is slidably mounted in the second arcuate groove.

5. The flexible display panel according to claim 1, wherein rotation axes of the first backplate and the second backplate are overlapped.

6. The flexible display panel according to claim 5, wherein the hinge further comprises a rotation fixing member, and the rotation fixing member is fixedly connected with the support member between the two interspaced support members, and the first backplate and the second backplate are movably connected to the rotation fixing member.

7. The flexible display panel according to claim 6, wherein a first shaft hole is defined on the first backplate, a second shaft hole is defined on the second backplate, a third shaft hole is defined on the rotation fixing member, and axes of the first shaft hole, the second shaft hole, and the third shaft hole are overlapped.

8. The flexible display panel according to claim 1, wherein the rotation mechanism comprises a first rotation member and a second rotation assembly, the first rotation member and the second rotation assembly are respectively connected to the two adjacent support members, and the first rotation member is movably connected to the second rotation assembly.

9. The flexible display panel according to claim 8, wherein the second rotation assembly comprises a second rotation member and a third rotation member disposed at intervals, the first rotation member is fixedly connected to one of the two adjacent support members, the second rotation member and the third rotation member are fixedly connected to another one of the two adjacent support members, and the first rotation member is slidably connected to the second rotation member and the third rotation member.

10. The flexible display panel according to claim 9, wherein the hinge further comprises a linkage mechanism, the linkage mechanism is disposed on a side of the plurality of support members and between the support member and the first packaging mechanism, the linkage mechanism is connected to the two interspaced support members to synchronously rotate the two interspaced support members.

11. The flexible display panel according to claim 10, wherein the linkage mechanism comprises a linkage assembly, the linkage assembly comprises a first linkage member and a second linkage member, the first linkage member is connected to one of the two interspaced support members, the second linkage member is connected to another one of the two interspaced support members, and the first linkage member is synchronously connected to the second linkage member.

12. The flexible display panel according to claim 11, wherein the linkage mechanism further comprises a connection assembly, the connection assembly comprises a first connection member and a second connection member, the first connection member is connected to the first linkage member and one of the two interspaced support members, and the second connection member is connected to the second linkage member and another one of the two interspaced support members.

13. An electronic device, comprising the flexible display panel according to claim 1.

14. A hinge, comprising:

a plurality of support members;

a plurality of rotation mechanisms disposed on a side of the plurality of support members, each of the rotation mechanism being connected to two of the support members adjacent to each other to rotate the two adjacent support members relative to each other and a first packaging mechanism disposed on a side away from the plurality of support members, the first packaging mechanism comprising at least one first backplate and at least one second backplate, the first backplate being movably connected to the second backplate, the first backplate and the second backplate being respectively connected to two interspaced support members, and at least one support member is provided between the two interspaced support members;

wherein, when the plurality of support members are in a first position, the plurality of support members are horizontally arranged, the first packaging mechanism is unfolded to form a first included angle between the first backplate and the second backplate to shield the rotation mechanism; and when the plurality of support members are in a second position, the plurality of support members at two ends are opposite to each other and disposed on a same side of the support members in the middle, a second included angle is defined between the first backplate and the second backplate to shield the rotation mechanism, and the second included angle is less than the first included angle;

wherein the hinge further comprises a second packaging mechanism, the second packaging mechanism is disposed at an end of the plurality of support members and comprises a plurality of packaging members, and each packaging member is fixedly connected with a corresponding support member.

15. The hinge according to claim 14, wherein the first backplate and the second backplate are slidably connected to the packaging member at an end of the two interspaced support members, respectively.

16. The hinge according to claim 15, wherein a boss is defined on the packaging member slidably connected to the first backplate and the second backplate, a linear groove is respectively defined at each of two ends of the first backplate and the second backplate, and the boss is slidably fitted to a corresponding linear groove.

17. The hinge according to claim 14, wherein rotation axes of the first backplate and the second backplate are overlapped.

18. A flexible display panel, comprising a hinge and a flexible display panel body, the hinge comprising:

a plurality of support members;

a plurality of rotation mechanisms disposed on a side of the plurality of support members, each of the rotation mechanisms being connected to two of the support members adjacent to each other to rotate the two adjacent support members relative to each other; and a first packaging mechanism disposed facing the plurality of rotation mechanisms, the plurality of rotation mechanisms being located among the first packaging mechanism and the plurality of support members, the first packaging mechanism comprising at least one first backplate and at least one second backplate, the first backplate being movably connected to the second backplate, the first backplate and the second backplate being respectively connected to two interspaced support members, and at least one support member being provided between the two interspaced support members;

wherein the flexible display panel body is located on another side of the plurality of support members away from the rotation mechanism, the flexible display panel body is in a flat state when the plurality of support members are in a first position, the plurality of support members are horizontally arranged and support the flexible display panel body, and the first packaging mechanism is unfolded to form a first included angle between the first backplate and the second backplate to shield the rotation mechanism;

wherein the hinge further comprises a linkage mechanism, the linkage mechanism is disposed on a side of the plurality of support members and between the support member and the first packaging mechanism, the linkage mechanism is connected to the two interspaced support members to synchronously rotate the two interspaced support members.

19. The flexible display panel according to claim 18, wherein the linkage mechanism comprises a linkage assembly, the linkage assembly comprises a first linkage member and a second linkage member, the first linkage member is connected to one of the two interspaced support members, the second linkage member is connected to another one of the two interspaced support members, and the first linkage member is synchronously connected to the second linkage member.

20. The flexible display panel according to claim 19, wherein the linkage mechanism further comprises a connection assembly, the connection assembly comprises a first connection member and a second connection member, the first connection member is connected to the first linkage member and one of the two interspaced support members, and the second connection member is connected to the second linkage member and another one of the two interspaced support members.

* * * * *